(12) United States Patent
McCalla et al.

(10) Patent No.: US 7,143,883 B2
(45) Date of Patent: Dec. 5, 2006

(54) HUB ASSEMBLY HAVING A CLUTCH RING TRAVEL LIMITER

(75) Inventors: John M. McCalla, Portland, OR (US); Scott J. Pugliese, Portland, OR (US); Bryan M. Averill, Portland, OR (US)

(73) Assignee: Warn Industries, Inc., Milwaukie, OR (US)

( * ) Notice: Subject to any disclaimer, the term of this patent is extended or adjusted under 35 U.S.C. 154(b) by 76 days.

(21) Appl. No.: 11/013,105

(22) Filed: Dec. 15, 2004

(65) Prior Publication Data

US 2006/0124427 A1 Jun. 15, 2006

(51) Int. Cl.
*F16D 11/10* (2006.01)
*B60K 23/08* (2006.01)

(52) U.S. Cl. ............... 192/69.41; 192/69.9; 192/109 R
(58) Field of Classification Search ..... 192/69.4–69.43
See application file for complete search history.

(56) References Cited

U.S. PATENT DOCUMENTS

| | | | |
|---|---|---|---|
| 5,586,632 A * | 12/1996 | Bigley et al. ............ | 192/69.41 |
| 5,740,895 A | 4/1998 | Bigley | |
| 5,984,422 A | 11/1999 | Seifert | |
| 6,009,609 A * | 1/2000 | Hanno ...................... | 29/401.1 |
| 6,170,628 B1 | 1/2001 | Bigley | |
| 6,234,289 B1 | 5/2001 | Baker et al. | |
| 6,299,360 B1 | 10/2001 | Dougherty et al. | |
| 6,318,492 B1 * | 11/2001 | Goddard et al. ............ | 180/247 |
| 6,371,268 B1 * | 4/2002 | McMorris et al. ....... | 192/69.41 |
| 2003/0094344 A1 * | 5/2003 | Pugliese et al. ......... | 192/69.41 |

* cited by examiner

*Primary Examiner*—Richard M. Lorence
(74) *Attorney, Agent, or Firm*—Harness, Dickey & Pierce, P.L.C.

(57) ABSTRACT

A wheel hub assembly is provided including a movable clutch ring for selective engagement between an engaged and disengaged position for providing driving torque from an axle shaft to a wheel hub. The clutch ring is in full-time engagement with external clutch teeth of the axle shaft and is movable to an engaged position with external clutch teeth of a coupler that is secured to the wheel hub. Furthermore, the coupler is provided with a travel limiter for preventing the clutch ring from traveling beyond a predetermined desired position along the coupler.

7 Claims, 7 Drawing Sheets

US 7,143,883 B2

HUB ASSEMBLY HAVING A CLUTCH RING TRAVEL LIMITER

FIELD OF THE INVENTION

The present invention relates to an actuator for initiating the shifting action of a clutch to affect engagement/disengagement of drive and driven shafts.

BACKGROUND AND SUMMARY OF THE INVENTION

In recent years it has become increasingly popular to provide vehicles with the ability to convert between two-wheel and four-wheel drive. As popularity has grown, so to have the many ways of affecting conversion. In one example there is a permanently driven drive line segment to the rear wheels of a vehicle, and a part-time driven drive line segment to the front wheels. The part-time driven drive line segment is simply disconnected/decoupled from the engine's drive shaft at the transmission or transfer case and that segment is rendered passive (undriven).

There is often a second point of disconnection which may be at or near the differential (a center disconnect) or at both wheels. There is a mechanical action that takes place to achieve each connection and disconnection as contemplated herein. Two shafts or drive line segments are in close relationship and a clutch ring that is permanently coupled to one shaft is slidable into engagement with the other shaft to couple the shafts and is slidable out of engagement with other shaft to decouple the two shafts.

The sliding movement is achieved by what will here be referred to as an actuator. The actuator can be many types including, e.g., a shift lever, manual or electrically driven, it can be cam actuated and it can be pneumatically actuated.

Pneumatic actuators in general are not new. Pneumatic actuators of this kind are disclosed in commonly assigned U.S. Pat. Nos. 5,704,895; 6,109,411 and 6,234,289. In the above listed patents, the clutch ring and components to be coupled are rotating and the annular actuator is designed to shift a non-rotating member (referred to as a fork) that is placed in contact with the rotating clutch ring. The contact between the rotating clutch ring and fork is designed to form a bearing that permits rotation of the clutch ring while the entire actuator remains static. The annular configuration of the actuator which surrounds the juncture to be coupled enables the use of a greater surface area on which the air acts. Thus, the available air pressure (from the manifold) is being applied to the greater surface area and produces a greater accumulated force. The diaphragm that is used as the movable wall is made of material that conforms and seals against metal objects. Placing the diaphragm in an opening that needs otherwise to be sealed allows the diaphragm to serve dual purposes.

Having thus achieved a far more efficient air actuated clutch ring actuator, all or most of the actuators heretofore provided along the drive line are advantageously replaced with the annular actuator of the patented designs.

Even with the improved performance and efficiency of the air actuated clutch ring actuator, additional improvements in the manufacture and assembly of the hub assembly have been developed. In particular, the present invention provides a clutch ring travel limiter to reduce the risk of damage to the shift fork during assembly of the half shaft to the wheel end. Additionally, a coupler is secured to the wheel hub by roll-forming the inboard end of the wheel hub around the coupler.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
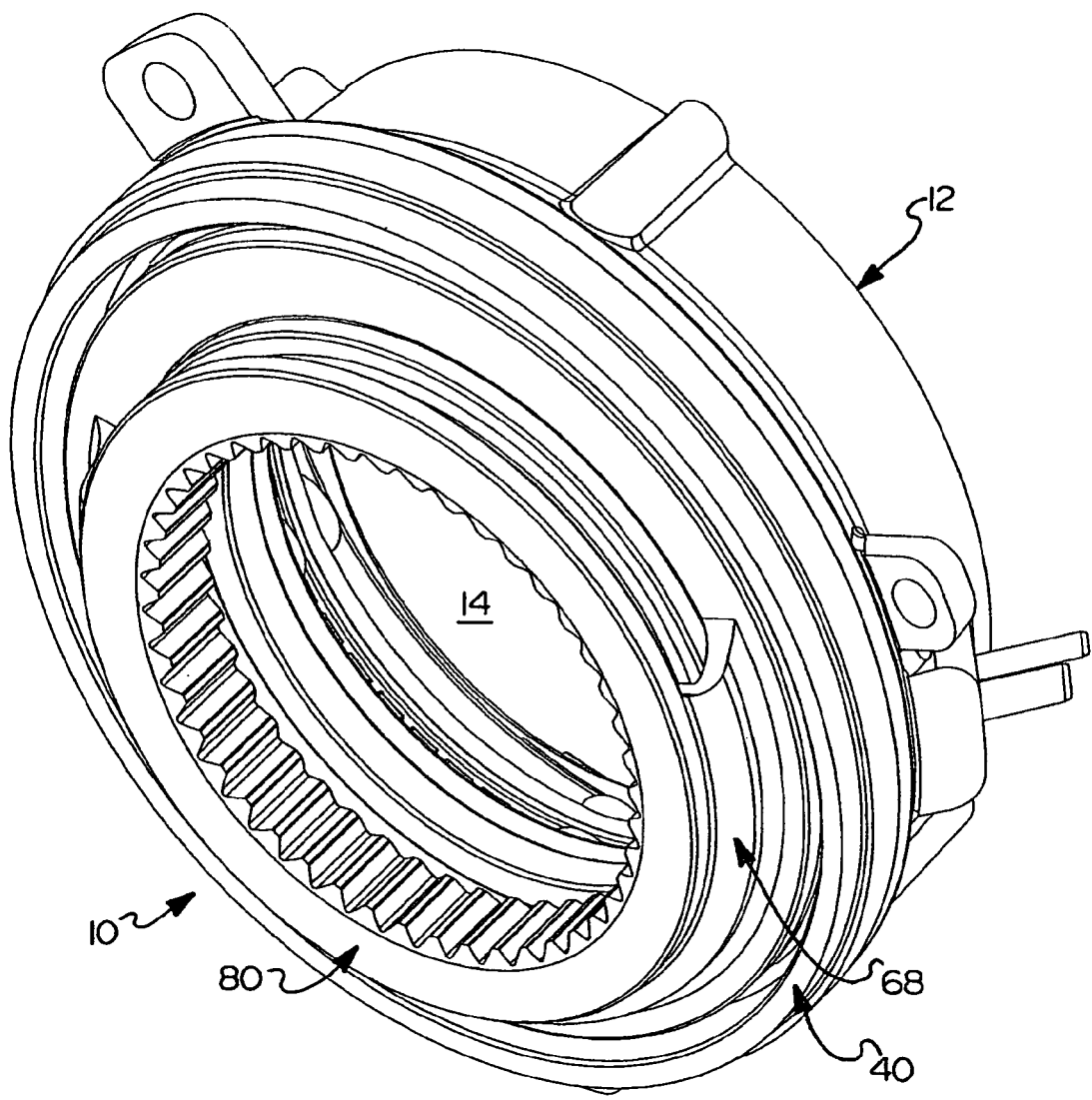
FIG. 1 is a perspective view of an annular actuator of the present invention.
Figure 2:
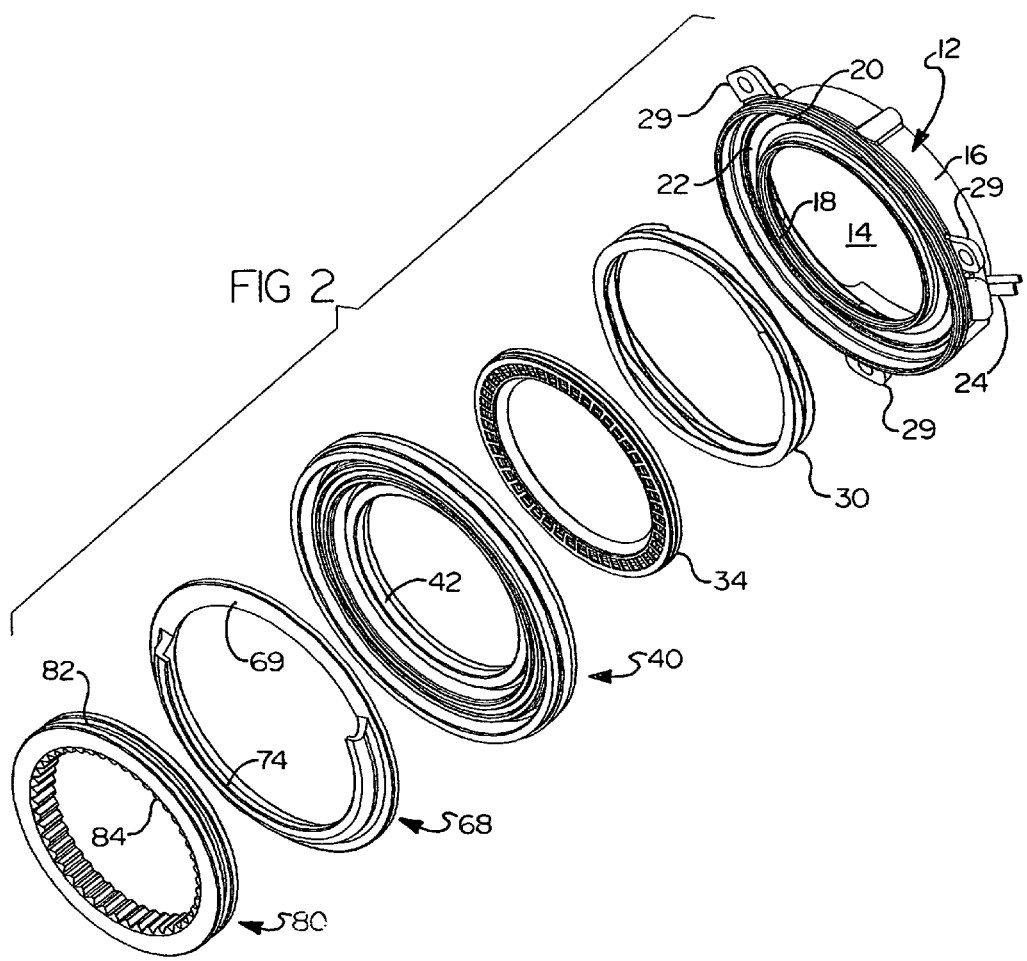
FIG. 2 is an exploded view of the annular actuator of FIG. 1.

FIGS. 1–4 illustrate one embodiment of an annular actuator 10 of the present invention. Referring to FIGS. 1 and 2, the actuator 10 has a housing 12 that is arranged to be fixedly mounted in a non-rotative manner. The actuator 10 is circular in configuration and has a center opening (bore) 14. A defined gas chamber 22 (best shown in FIG. 3) is formed within the housing 12 including a pliable diaphragm 40 which defines a movable wall of the chamber 22. The diaphragm 40 is biased axially outwardly by a biasing member such as a spring 30 which expands the chamber 22. The diaphragm 40 is moved axially inwardly by withdrawing a media from the defined chamber 22 which contracts the chamber against the biasing force of the spring 30.

Referring now to the exploded view of FIG. 2, the housing 12 of the actuator 10 is preferably molded and is circular in configuration resembling a ring like structure. The housing 12 has its center opening 14 defined by an inner wall 18 extending from a base portion 20. An outer circular wall 16 also extends from the base portion 20 in combination with the inner wall 18 and the base portion 20 define the fixed wall portion of the interior vacuum or gas chamber (cavity) 22.

The outer surface of the wall 16 typically has a slight taper resulting from the molding operation. A port 24 communicates with the chamber 22 and is provided to input or exhaust air from the defined chamber 22. As shown in the figure, the outer wall 16 extends from the base portion 20 a slightly greater distance than the inner wall 18. Projecting tabs 29 are provided to facilitate mounting the housing 12 to a member of a vehicle chassis, although other mounting arrangements are clearly possible.

A spring 30 is sized to fit within the chamber 22 between the walls 18 and 16 with one end of the spring 30 being in abutment with the base portion 20 of the housing 12. A piston 34 that is ring like in structure abuts the spring 30 when the components of the actuator 10 are assembled. The piston 34 is placed on an opposite side of the diaphragm 40 from a shifting fork 68 as will be later explained.

The elastomeric pliable diaphragm 40 is configured to fit the housing 12 of the actuator 10. A rim 42 of the diaphragm 40 is sized to fit within the bore 14 (fitted against wall 18) of the housing 12. The rim 42 is reinforced by a metallic ring 44 (best shown in FIG. 4) that is molded integral with the rim 42. Upon installation, the rim 42 is press fit into the bore 14 which provides a seal (between the wall 18 and the diaphragm 40) to seal the chamber 22 of the housing 12. The end of the ring 44 may be swaged over (see FIG. 3) to assure retention of the rim 42 in the bore 14. The outer diameter 50 of the diaphragm 40 has a projecting bead 52 formed around its periphery. A ring 54 molded integral with the diaphragm 40 (FIG. 3) supports the bead 52 and acts as a compression member to compress the bead 52 against the outer surface of the housing 12 upon installation. When the diaphragm 40 is installed on the housing 12, the bead 52 will be in compressive contact with the outer surface of the wall 16 which provides a seal (between the wall 16 and the bead 52 of the diaphragm 40) to seal the chamber 22 of the housing 12. A base portion 56 of the diaphragm 40 is secured to the piston 34.

A peripheral ultrasonic weld is provided between the circular shifting fork 68 and the piston 34 with the diaphragm 40 sandwiched in between. The fork 68 has a projecting L-shaped arcuate section 74 extending from the base portion 69 that is configured to reside in a groove 82 of a clutch ring 80.

The circular clutch ring 80 has a peripheral groove 82 that receives the L-shaped section 74 of the shifting fork 68. The groove 82 and the formed section 74 provide a bearing section such that the clutch ring 80 may rotate relative to the shifting fork 68. The clutch ring 80 has internal clutch teeth 84 that are matable with clutch teeth of a drive and driven member of a vehicle.

Figure 3:
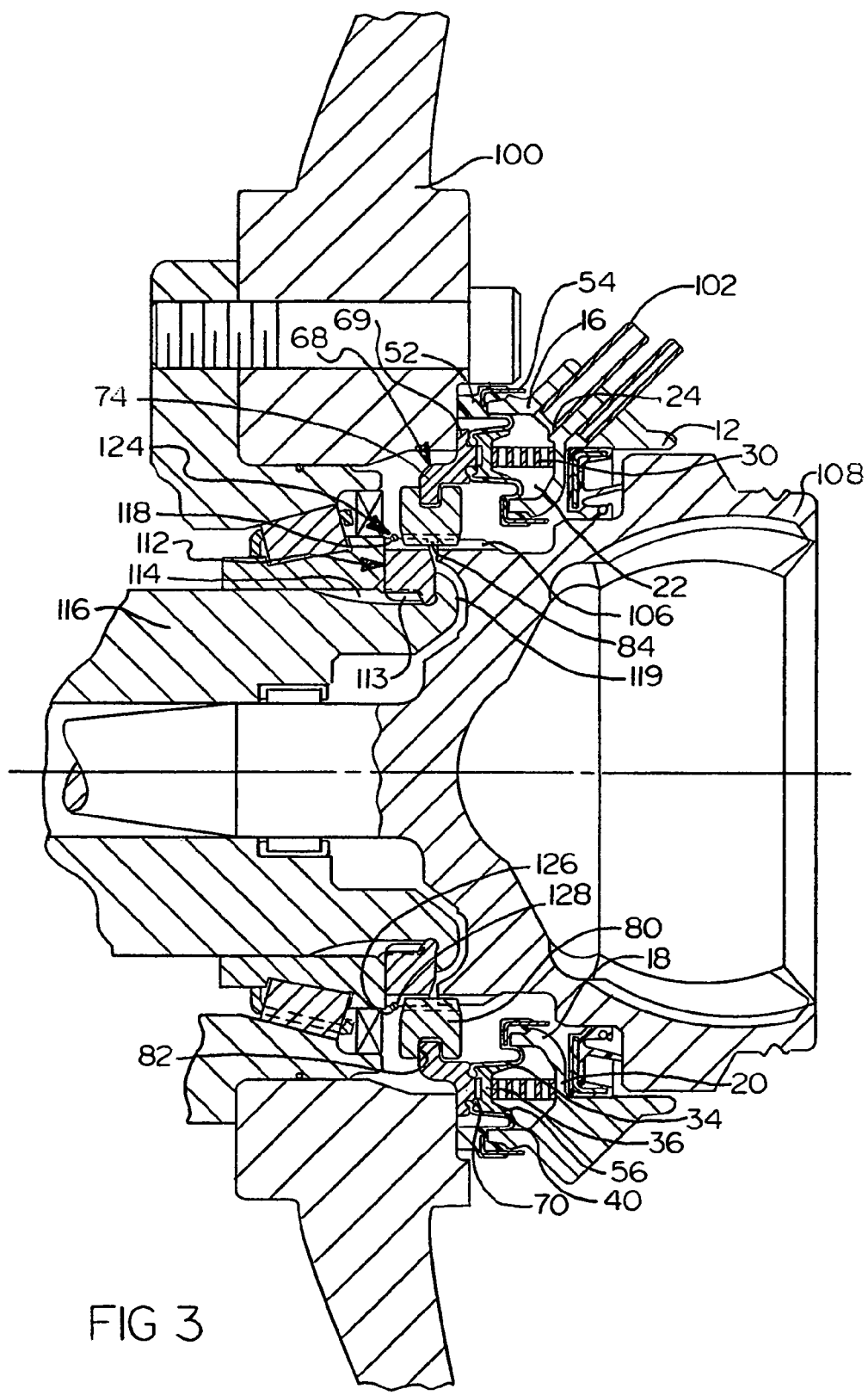
FIG. 3 is a cross sectional view of the annular actuator of FIG. 1 as applied to a wheel hub showing the engaged position.
Figure 4:
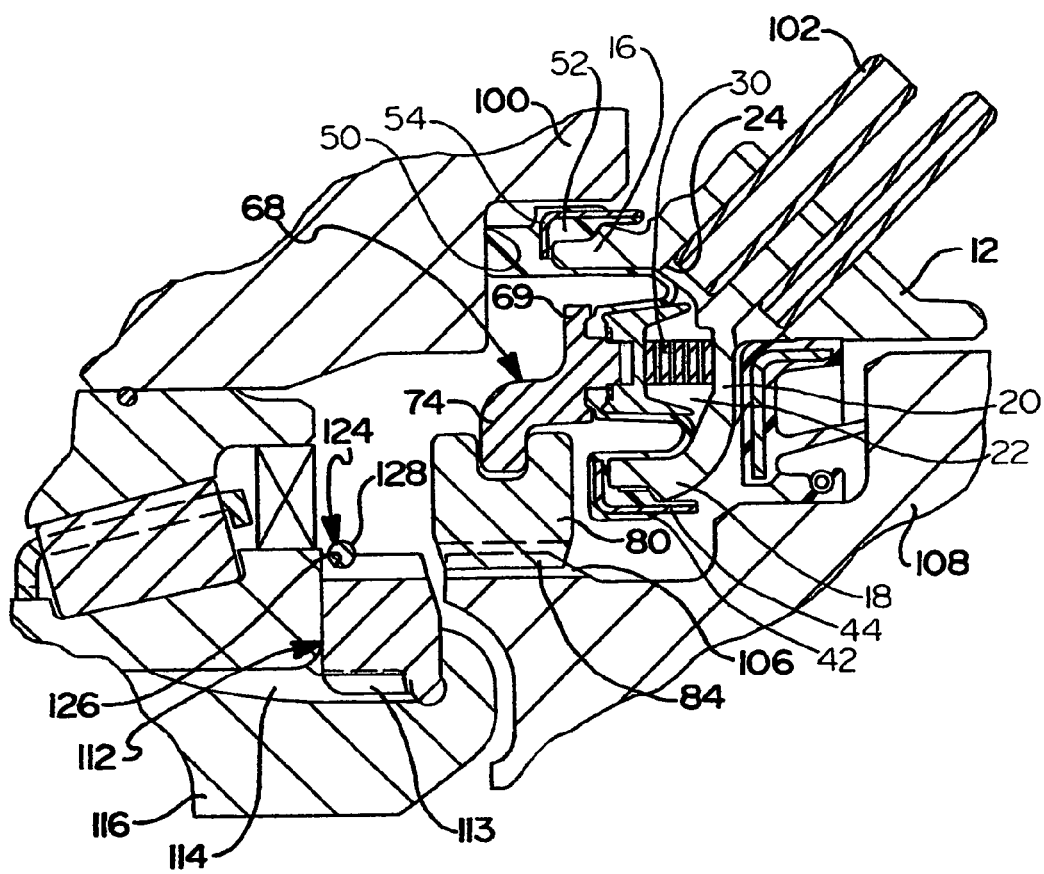
FIG. 4 is a view similar to FIG. 3 but showing the disengaged position.

FIGS. 3 and 4 of the drawings illustrate the annular actuator applied to a wheel hub. The housing 12 of the actuator is fixedly mounted to a knuckle 100 of the vehicle. An air line 102 is coupled to the port 24 of the housing 12 with the air line 102 being connected to an air source such as an intake manifold. The actuator is assembled as previously described with the clutch ring 80 being rotatable relative to the fork 68. As shown, the L-shaped section 74 of the fork 68 fits in the groove 82 of the clutch ring 80. The internal clutch teeth 84 of the clutch ring 80 are permanently engaged with clutch teeth 106 on axle shaft 108. A coupler 112 having internal splines 113 is mounted on the wheel hub spindle 116 with the internal splines 113 of the coupler 112 being mated with the external splines 114 of the wheel hub spindle 116. The coupler 112 has external clutch teeth 118 that are alignable with the clutch teeth 106 of the axle shaft 108. The coupler 112 being in splined engagement with the hub spindle 116 rotates with the hub spindle 116. The end 119 of the hub spindle 116 is roll formed around the inboard edge of the coupler 112.

The coupler 112 is provided with an outside diameter ring 124 to limit the clutch ring 80 travel relative to the coupler 112. The outside diameter ring 124 provides a supplemental stop against which the clutch ring 80 can abut during installation of the half shaft 108. Specifically, as the hub assembly is being assembled to the half shaft 108, the clutch teeth 84, 118 of the clutch ring 80 and coupler 112, respectively, are aligned but the half shaft clutch teeth 106 may be out of alignment with the internal clutch teeth 84 of the clutch ring 80. In this instance, the forces applied to the clutch ring 80 by the half shaft 108 would have a tendency to press against the ends of the splines 84 of the clutch ring 80 while the base portion 69 of the shift fork 68 is in abutting relationship with the knuckle 100. Since the base portion 69 is pressed against the knuckle 100, forces applied to the clutch ring 80 might impart undesirable forces on the L-shaped section 74 of the shifting fork 68 that can potentially cause breakage or cracking of the shift fork 68 during installation. Thus, the travel limiter ring 124 prohibits the clutch ring 80 from applying undesirable forces on the shift fork 68 during installation and alignment of the clutch teeth 106 of the half shaft 108 with the internal clutch teeth 84 of the clutch ring 80. The travel limiter ring 124 can also function as the travel limiter during normal actuation.

It is anticipated that the travel limiter 124 can take on several forms. In particular, as shown in FIGS. 3 and 4, the outside diameter of the coupler 112 is provided with a recessed portion 126 and a separate ring member 128 is received in the recessed groove to provide a travel limiter against which the clutch ring 80 is abutted. It is noted that in order to reduce the size and weight of the clutch ring 80, the clutch ring 80 has a smaller outside diameter than the inside diameter of the knuckle 100, so that the knuckle 100 does not serve as a stop for the clutch ring 80, but may serve as a stop for the base portion 69 of the shift fork 68 as shown.

Figure 5:
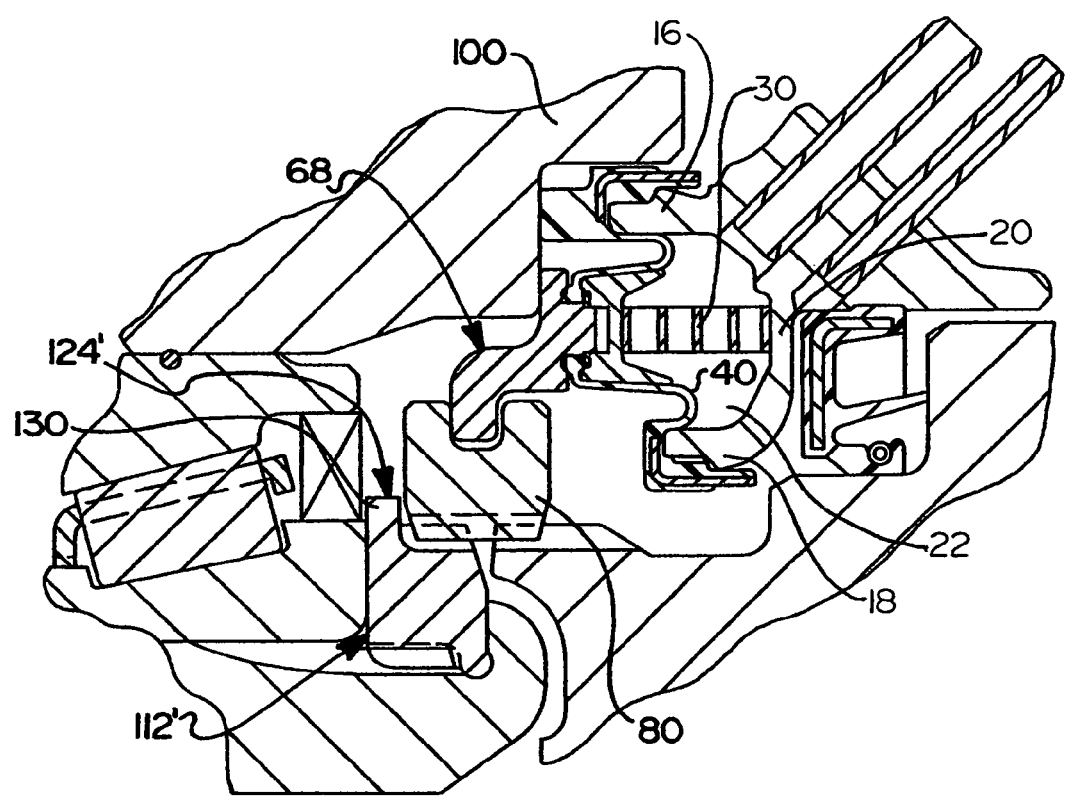
FIG. 5 is a detailed cross-sectional view of an alternative coupler design.
Figure 6:
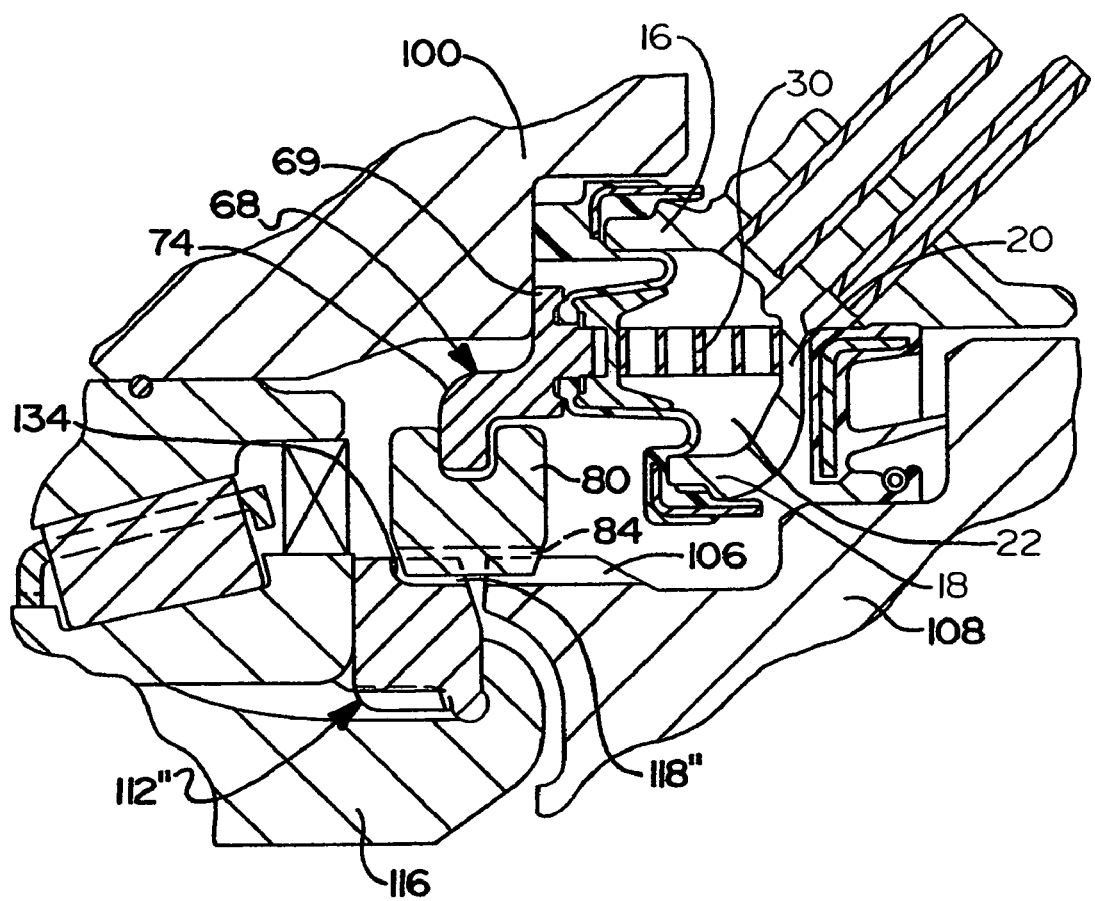
FIG. 6 is a detailed cross-sectional view of a second alternative coupler design.
Figure 7:
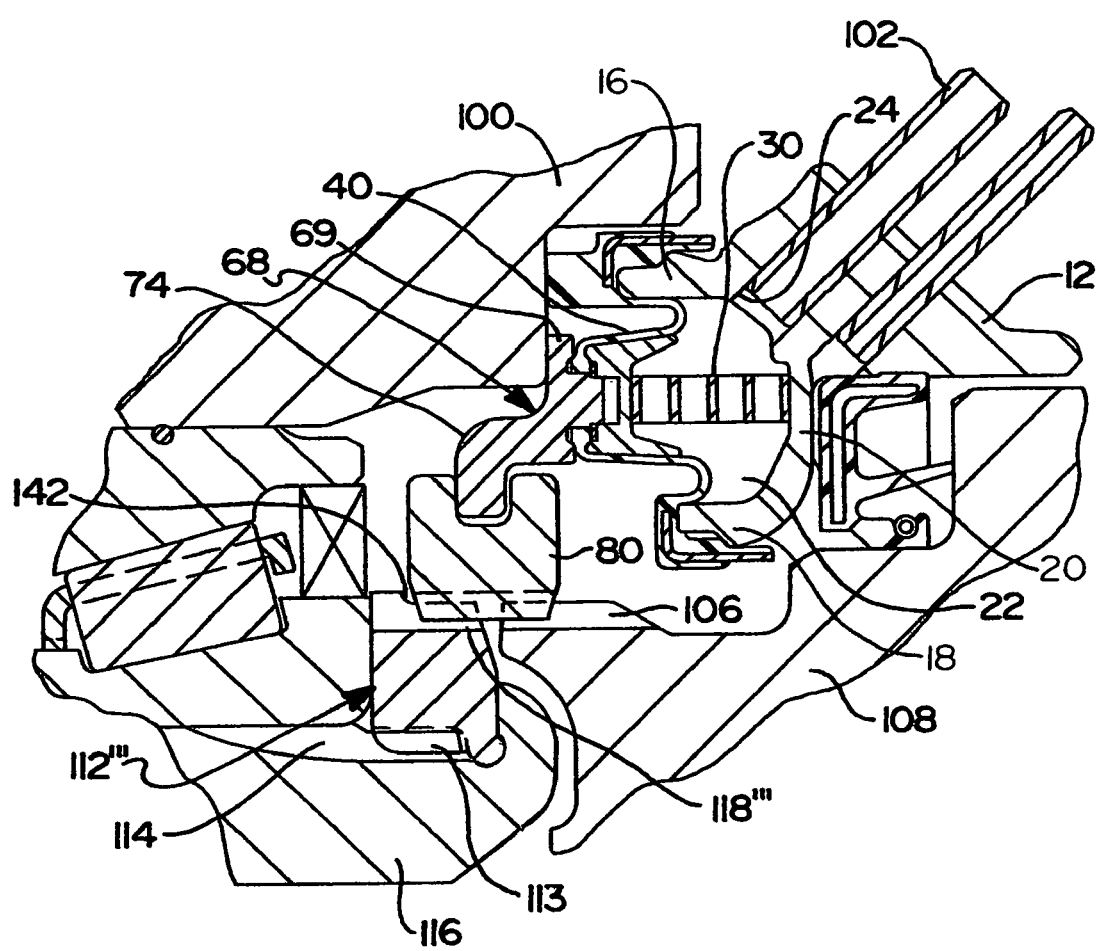
FIG. 7 is a detailed cross-sectional view of a third alternative coupler design.

Alternative designs of the travel limiter are illustrated in FIGS. 5–7. In the embodiment shown in FIG. 5, the travel limiter 124' is integrally formed with the coupler 112' and has a radially outwardly extending portion 130 against which the clutch ring 80 abuts prior to exceeding the desired range of motion of the clutch ring 80.

As illustrated in FIG. 6, the external clutch teeth 118" of the coupler 112" have a closed end portion 134 against which the end of the internal clutch teeth 84 of the clutch ring 80 abut in order to limit axial movement of the clutch ring 80 relative to the coupler 112" beyond a predetermined desired position to thereby prevent excessive forces from being applied to the shift fork 68 during installation of the hub assembly to the axle shaft 108.

In yet another embodiment, as shown in FIG. 7, the clutch teeth 118''' of the coupler 112''' extend across the outer diameter of the coupler 112''' and a radially outwardly extending shoulder portion 142 extends radially outward such that the clutch ring 80 abuts the shoulder portion 142 for preventing further movement of the clutch ring 80 relative to the coupler beyond a predetermined desired distance. The shape of the clutch teeth 118''' extending across the outer diameter of the coupler 112''' allows for easier forming of the external clutch teeth 118'''.

The spring 30 of the actuator is captive between the base 20 and the piston 34 and urges the assembly of the piston 34, diaphragm 40 and fork 68 to move axially away from the base 20 of the housing 12. The spring 30 moves the clutch ring 80 axially along the clutch teeth 106 of the axle 108 and will urge the clutch ring 80 into engagement with the clutch teeth 118 of the coupler 112. Thus, the spring force positions the clutch ring 80 in engagement with both the axle 108 and the coupler 112 (FIG. 3) and since the coupler 112 is in splined engagement with the hub spindle 116, the hub spindle 116 rotates with the axle 108. During normal actuation in the assembled condition, the knuckle 100 provides a travel limiter function to limit the travel of the fork 68 and clutch ring 80.

When air is withdrawn from the housing 12 via port 24, negative air (vacuum) pressure generated within the chamber 22 of the housing 12 will force the assembly of the piston 34, the diaphragm 40 and the fork 68 toward the base 20 of the housing 12. Negative air pressure is sufficient to compress the spring 30 and thus the clutch ring 80 will be moved out of engagement with the coupler 112 to be only engaged with the axle 108 as shown in FIG. 4.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel hub assembly, comprising:
   an axle shaft having clutch teeth thereon;
   a wheel hub having a spindle portion with a coupling feature on an inboard portion thereof, said wheel hub being rotatably supported adjacent to said axle shaft;
   said coupling feature including clutch teeth capable of being aligned with said clutch teeth of said axle shaft;
   a clutch ring having clutch teeth slidably engaged with the clutch teeth of one of said axle shaft and said coupling feature and engageable with the clutch teeth of the other of said axle shaft and said coupling feature;
   a shift fork engaged with said clutch ring, said shift fork configured to abut a structure during installation of said clutch ring; and
   a travel limiter associated with the coupling feature to limit axial movement of said clutch ring toward an outboard end of said coupling feature when said shift fork abuts said structure during installation.

2. The wheel hub assembly according to claim 1, wherein said travel limiter includes an annular member located on an outside diameter of said coupling feature.

3. The wheel hub assembly according to claim 1, wherein said travel limiter includes closed end portions on said clutch teeth of said coupling feature.

4. The wheel hub assembly according to claim 1, wherein said clutch teeth of said coupling feature extend across an entire width of said coupling feature and said travel limiter of said coupling feature includes radially extending shoulders extending from an outboard side of said clutch teeth of said coupling feature.

5. A wheel hub assembly, comprising:
   an axle shaft having clutch teeth thereon;
   a wheel hub having a spindle portion with a coupling feature on an inboard portion thereof, said wheel hub being rotatably supported adjacent to said axle shaft;
   said coupling feature including clutch teeth capable of being aligned with said clutch teeth of said axle shaft, wherein said clutch teeth of said coupling feature extend across an entire width of said coupling feature;
   a clutch ring having clutch teeth slidably engaged with the clutch teeth of one of said axle shaft and said coupling feature and engageable with the clutch teeth of the other of said axle shaft and said coupling feature; and
   a travel limiter associated with the coupling feature to limit axial movement of said clutch ring toward an outboard end of said coupling feature, said travel limiter of said coupling feature includes radially extending shoulders extending from an outboard side of said clutch teeth of said coupling feature.

6. The wheel hub assembly according to claim 5, wherein said travel limiter includes an annular member located on an outside diameter of said coupling feature.

7. The wheel hub assembly according to claim 5, wherein said travel limiter includes closed end portions on said clutch teeth of said coupling feature.

* * * * *